(12) United States Patent
Lee

(10) Patent No.: US 8,934,609 B2
(45) Date of Patent: Jan. 13, 2015

(54) METHOD AND APPARATUS FOR IDENTIFYING AND MONITORING VOIP MEDIA PLANE SECURITY KEYS FOR SERVICE PROVIDER LAWFUL INTERCEPT USE

(75) Inventor: Michael Lee, Ottawa (CA)

(73) Assignee: Genband US LLC, Plano, TX (US)

( * ) Notice: Subject to any disclaimer, the term of this patent is extended or adjusted under 35 U.S.C. 154(b) by 2227 days.

(21) Appl. No.: 11/425,436

(22) Filed: Jun. 21, 2006

(65) Prior Publication Data

US 2007/0297418 A1    Dec. 27, 2007

(51) Int. Cl.
*H04M 1/24* (2006.01)
*H04L 29/06* (2006.01)
*H04L 12/26* (2006.01)

(52) U.S. Cl.
CPC ............... *H04L 63/00* (2013.01); *H04L 63/04* (2013.01); *H04L 63/06* (2013.01); *H04L 63/30* (2013.01); *H04L 65/1083* (2013.01); *H04L 63/306* (2013.01); *H04L 43/00* (2013.01)
USPC ........ 379/35; 370/352; 370/395.52; 370/471; 380/30; 380/275; 380/277; 380/285; 380/286; 709/224; 709/227; 379/32.01; 379/112.01; 379/213.01; 705/50

(58) Field of Classification Search
CPC ............... H04L 63/00–63/30; H04L 2209/80; H04L 63/306; H04L 63/0428; H04L 9/083; H04L 9/0869; H04L 9/08; H04W 12/04
USPC ............ 370/395, 471, 352–356; 380/30, 277, 380/275, 285, 286; 379/35, 32.01, 112.01, 379/213.01; 709/224–227
See application file for complete search history.

(56) References Cited

U.S. PATENT DOCUMENTS

| | | | |
|---|---|---|---|
| 2002/0154769 A1* | 10/2002 | Petersen et al. | 380/42 |
| 2003/0110385 A1* | 6/2003 | Golobrodsky et al. | 713/188 |
| 2003/0187598 A1* | 10/2003 | Hars | 702/75 |
| 2004/0157629 A1* | 8/2004 | Kallio et al. | 455/466 |
| 2004/0168050 A1* | 8/2004 | Desrochers et al. | 713/153 |

(Continued)

OTHER PUBLICATIONS

"Packet-based multimedia communications systems," Series H: Audiovisual and Multimedia Systems, ITU-T, H.323, pp. 1-320 (Dec. 2009).

(Continued)

*Primary Examiner* — Melanie Jagannathan
*Assistant Examiner* — Najeebuddin Ansari
(74) *Attorney, Agent, or Firm* — Jenkins, Wilson, Taylor & Hunt, P.A.

(57) ABSTRACT

A mechanism is described that enables encrypted end-point communications in a VoIP network to be accessed by a service provider. The mechanism includes a session information retrieval component which gathers session information such as encryption keys for each session that traverses a network element. The encryption keys may be used to decrypt data to make it available for lawful interception. A media stream monitoring component monitors media streams and verifies that the identified keys for each session are valid, to ensure continuity in compliance with LI regulations. Advantageously a security alert component may be used to controls further session operation for those sessions identified as potential security risks. With such an arrangement, the service provider can satisfy the legal requirement to provide interception, verify that the accuracy of the legal interception support and take appropriate steps to handle security risks.

16 Claims, 7 Drawing Sheets

(56) References Cited

U.S. PATENT DOCUMENTS

| | | | |
|---|---|---|---|
| 2004/0202295 A1* | 10/2004 | Shen et al. | 379/112.01 |
| 2005/0063544 A1* | 3/2005 | Uusitalo et al. | 380/277 |
| 2005/0094651 A1* | 5/2005 | Lutz et al. | 370/401 |
| 2005/0232424 A1* | 10/2005 | Dobranski et al. | 380/270 |
| 2005/0262338 A1* | 11/2005 | Irwin, Jr. | 713/155 |
| 2006/0107315 A1* | 5/2006 | Fiske | 726/17 |
| 2006/0212933 A1* | 9/2006 | Scoggins et al. | 726/11 |
| 2007/0053510 A1* | 3/2007 | Rosati et al. | 380/30 |
| 2009/0007263 A1* | 1/2009 | Frenkel et al. | 726/22 |
| 2009/0122712 A1* | 5/2009 | Sharif-Ahmadi et al. | 370/252 |
| 2009/0262723 A1* | 10/2009 | Pelletier et al. | 370/352 |
| 2009/0268615 A1* | 10/2009 | Pelletier | 370/241 |
| 2010/0039946 A1* | 2/2010 | Imbimbo et al. | 370/252 |
| 2011/0158400 A1* | 6/2011 | Thomas | 380/28 |

OTHER PUBLICATIONS

Rosenberg et al., "SIP: Session Initiation Protocol," RFC 3261, pp. 1-269 (Jun. 2002).

* cited by examiner

METHOD AND APPARATUS FOR IDENTIFYING AND MONITORING VOIP MEDIA PLANE SECURITY KEYS FOR SERVICE PROVIDER LAWFUL INTERCEPT USE

FIELD OF THE INVENTION

This invention relates generally to the field of telecommunications and more particularly to a method and apparatus for supporting lawful interception of telecommunications in a voice over internet protocol (VoIP) network.

BACKGROUND OF THE INVENTION

Lawful Interception (LI) involves the interception of telecommunications by law enforcement authorities (LEA's) and intelligence services pursuant to local law, due process and authorization from competent authorities. Different countries have different rules with regards to lawful interception; for example, the Communications Assistance for Law Enforcement Act (CALEA) sets forth compliance standards which must be adhered to by all telecom service providers operating in the United States. In general, the LI statutes require a service provider to transparently intercept any communications that occur between end points in their network.

Historically, communications over the Public Switched Telephone Network (PSTN) have been relatively easy to intercept by placing physical wire-taps on the PSTN carrier lines. However, the growth in Voice Over Internet Protocol (VoIP) devices and applications has changed the traditional telecommunication model from one of defined physical links to one where links are dynamic and mobile. In VoIP networks, voice signals are digitized and carried as IP packets over the Internet. Unlike the PSTN voice transmissions, where an end-point is typically associated with a fixed physical location, a VoIP end-point is not constrained to a single physical location, but rather can communicate wherever the end user can gain access to the Internet. VoIP thus allows users to travel anywhere in the world and still make and receive phone calls.

However, some inherent characteristics of the IP network increase the complexity of implementing LI for VoIP networks. While PSTN connections are circuit based, with signals for a given call transferred along a common path to the end-point, the IP network is packet based. Voice communications in a VoIP network are apportioned into packets and forwarded to an end-point, with each packet potentially taking different paths, and arriving out of sequence at the end-point. The particular route that is selected for each packet of an IP telephony transmission is dependent upon a variety of factors, including, for example loading at each of the intermediate device. As such, it is difficult to predict the path and device that a given VoIP packet may traverse en route to its destination.

Because it is difficult to predict the network path that may be used for VoIP communications, it is difficult to protect communications from eavesdroppers. For example, as VoIP communications traverse the Internet, the information exchanged can be intercepted by anyone at any time. Moreover, because of its popularity VoIP has become a soft target for the hackers. In the absence of strong security which may include a strong firewall system, hackers may capture sensitive information such as credit card numbers and bank details. They can even launch denial of service attacks and shut down a voice conversation, or send spam or viruses over the internet to disrupt the services.

In order to secure VoIP connections, end-points have begun to encrypt communications through the use of encryption technology and key exchanges or other such peer authentication techniques. When end-point peers encrypt VoIP communications in such a manner, intermediate devices that do not have access to the key information are not able to decrypt the communications to intercept the communications. While this is advantageous for the end-points, it makes it difficult for the service provider to comply with the lawful interception statutes that are in force since intermediate SPs do not have the key. It would be desirable to identify a method an apparatus that would allow end-points to maintain secure connections while enabling service providers to comply with lawful interception statutes.

SUMMARY OF THE INVENTION

According to one aspect of the invention a method of obtaining session information in a network is provided, where the network includes a plurality of end points coupled by at least one network element. The method includes the steps of establishing a secure communication channel with a first end-point by the at least one network element and forwarding session initiation requests and responses between the first end-point and the second end-point to establish a session for an exchange of media between the first end-point and the second end-point. The session has at least one characteristic which is retrieved by the network element from the first end-point using the secure channel, and stored by the network element for later use. The at least one characteristic of the session may include an encryption key, codec, compression type or rate, or other information that may be of interest in determining an encryption status of the media. The arrangement of the present invention thus permits a network element that participates in a peer-to-peer call session to extract encryption keys used to secure peer-to-peer media transfers. The network element is part of a service provider network, and the service provider may make the encryption keys available to legal interceptors upon request. The present invention thus provides a mechanism by which service providers may comply with government Legal Interception requirements.

According to another aspect of the invention, a network element includes session sampling logic for periodically sampling media exchanged in a peer-to-peer session between two end-points and analysis logic, coupled to the session sampling logic. The analysis logic includes logic for monitoring media exchanged between the two end-points, logic for determining whether the encryption methods used on the media are known; and logic for marking sessions having unknown encryption methods as potential security risks.

According to a further aspect of the invention, a method of maintaining an ability to access end user communications in a network includes the steps of detecting a session between two end-points, the session including a control plane and a media plane, storing a key used to encrypt the media plane of the session, and sampling media data exchanged during the session and decrypting the sampled data using the stored key to determine whether the media plane of the session is accessible.

With such an arrangement, the network element may readily identify sessions which are encrypted, but which have not accurately provided the key to the service provider. Having identified such sessions with heightened security risks, the service provider may terminate the session, or log and/or report the session to legal authorities.

DETAILED DESCRIPTION

Figure 1:
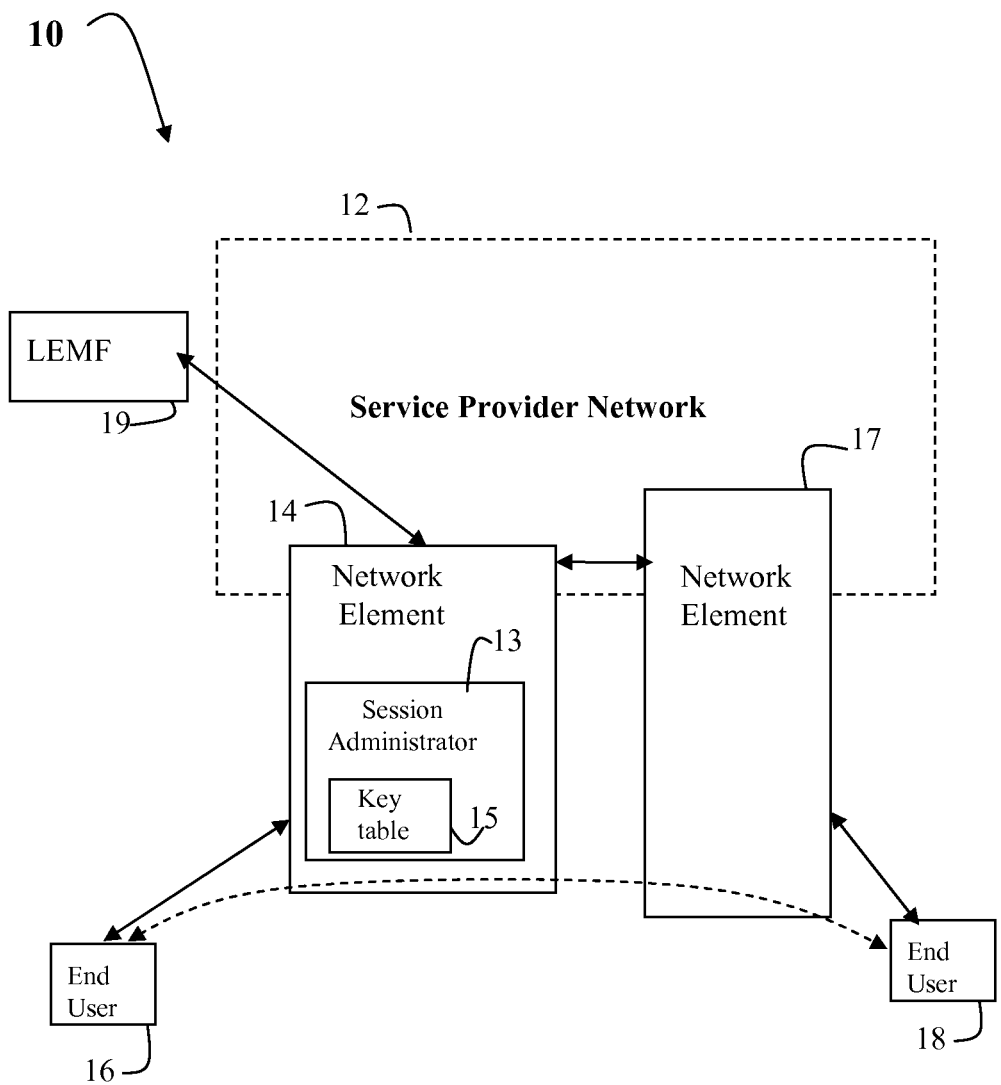
FIG. 1 illustrates an exemplary network in which the present invention may be utilized to identify and monitor media plane encryption.

FIG. 1 illustrates a network 10 capable of supporting Voice over Internet Protocol (VoIP) communications between end-points 16 and 18 using a service provider network 12. Voice over IP (also called VoIP, IP Telephony, Internet telephony, and Multimedia over IP) refers to technology that enables routing of voice, fax, video, multi-media and voice messaging in real-time over the Internet or any other IP network. For voice calls, such real-time Internet applications are based on real-time Internet protocols such as H.323, MGCP, Megaco/H.248 and Session Initiation Protocol (SIP). Fax calls can be based on real-time Internet protocols such as T.38. In accordance with the real-time Internet protocols, there exist a combination of signaling channels, control channels and bearer channels. Each channel is created by and composed of a stream of data packets.

The service provider network 12 is an interconnected system or routers and switches which are used to link service provider subscribers such as end-points 16 and 18. The details of the service provider network are not shown in FIG. 1; suffice it to say that each of the end-points 16 and 18 has the ability to access the service provider network via respective network elements 14 and 17. The network elements may be any service provider access point device, including, for example, an edge node of the network, a call server, a media gateway or a session border controller (SBC). A SBC is a device used in some VoIP networks to exert control over the signaling and media streams involved in setting up and tearing down calls. The SBC may act as a proxy device which sets up calls on behalf of an end-point device, with the media data being forwarded through the SBC en route to the end-points, thereby allowing the SBC to gain greater control over the distribution of media through and within the internet.

Whether the network element is an edge node, call server, or an SBC, call sessions are established between the end-points using VoIP protocols. Two VoIP protocols include a Session Initiation Protocol (SIP) and an H.323 protocol. Each of the protocols generally apportion communications between the end-points into two or more phases, including a call negotiation/scheduling phase (or control plane) and a data exchange phase (a media plane). During the control plane phase, end-points exchange control signals that identify various parameters of the call session including, for example, the parties to the call, a codec that is used to encode media data, etc. The parameters may also include an encryption key that is to be used to encode the media data. End-points may also negotiate and/or securely exchange encryption keys independently in a peer to peer manner without knowledge of the edge node, call server or SBC. When end-points of a session exchange encryption keys, access to the media data can be secured as the media data transits the internet because no other device besides authorized end users have access to the encryption key.

As mentioned above, a problem arises when a service provider is unable to decrypt encrypted end-point communications because service providers are required to support lawful interception. Lawful interception is a requirement placed on service providers to provide legally sanctioned access to private communications. The ability of a service provider to support lawful interception is frustrated by media plane encryption in a VoIP network.

According to one aspect of the invention, a mechanism is provided that enables encrypted end-point communications in a VoIP network to be accessed by a service provider. The mechanism includes three components; a session information retrieval component which gathers session information such as encryption keys for each session that traverses a network element, a media stream monitoring component which monitors media streams and verifies that the identified keys for each session are valid, and a security alert component which controls further session operation for those sessions identified as potential security risks. For example, the security alert component may communicate with a Law Enforcement Monitoring Facility (LEMF) 19 that is also coupled to the service provider 12. With such an arrangement, the service provider can satisfy the legal requirement to provide interception, verify that the accuracy of the legal interception support and take appropriate steps to handle security risks. Each of these components will be described below in greater detail.

Session Information Retrieval Component

In a telecommunications network, the term 'signaling' refers to the information exchange concerning the establishment and control of a connection and the management of the network. A secure communication path, referred to as a control and signaling channel (also known as a D channel), is established between each end-point and a network element of the service provider to carry signaling information. The signaling channel may be secured using mechanisms defined, for example, by one of the Transport Layer Security (TLS) protocol or Internet Protocol Security (IPSec) protocols. Signaling is used to define the transfer of data on one or more bearer channels (B channels). The general purpose of a VoIP network is to carry the contents of the B channel transparently between the endpoints of the call.

The particular signals provided by an end-point during call instantiation are dictated by the signaling protocol used at the end-point. As mentioned above, these protocols include but are not limited to the Session Initiation Protocol (SIP), [described in June 2002 in "SIP: Session Initiation Protocol"

Internet Engineering Task Force (IETF) Request For Comments (RFC) 3261, by Rosenberg, incorporated herein by reference] and the H.323 protocol [as defined by the ITU Telecommunication Standardization Sector (ITU-T) and incorporated by reference]. Different end-points in a VoIP network may utilize different VoIP protocols, with protocol translations being performed by the network elements of the service provider network.

Thus there are a variety of signaling protocols and the present invention is not limited to the use of any particular protocol. Rather, according to one aspect of the present invention, any signaling protocol may be augmented to include the ability to permit a network element to request that session information including an encryption key associated with a call session be forwarded to the network element. Exemplary fields that may be added to, or encoded within an existing request/response structures of any signaling protocol are shown in FIGS. 2A and 2B.

Figure 2A:
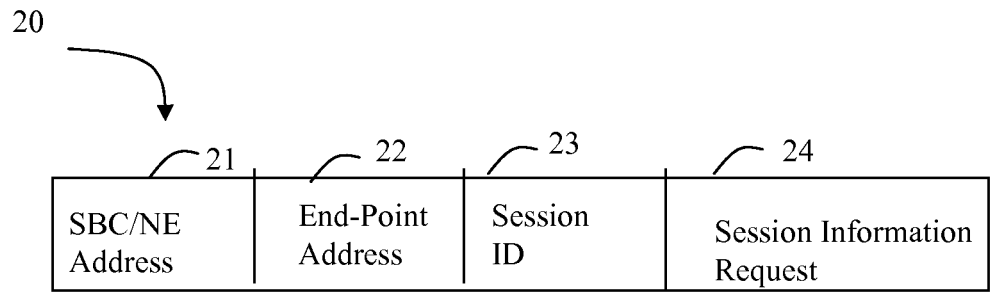
FIGS. 2A and 2B are illustrations of exemplary fields that may be included in response and request communications of the present invention which are used to obtain session information for use in supporting lawful interception.

For example, FIG. 2A illustrates an exemplary request packet 20, which includes a source address field 21, a destination address field 22, a session identifier field 23 and a session information request field 24. In the example of FIG. 2A, the source is the Network Element or SBC address and the destination is an end-point address. Depending upon the protocol, the address may take many forms, from an IP address to an HTML string. The session identifier 23 identifies a particular session for which the network element is seeking session information. In an alternate embodiment, the session identifier may be a wildcard, requesting session information for all sessions which the end-point is currently engaged, or may incorporate a temporal element to request session information for only recent sessions. Thus the session identifier field may be adapted depending upon the particular needs of a network element or LEMA.

The request field 24 is in one embodiment an encoded field which indicates the type of information that the network element desires from the end-point for the given session. For example, the session information could include an encryption key used to encrypt the session, a codec that was used to process analog voice data for the session, a compression type or compression rate, etc. The present invention is not limited to any particular type of session information, but rather may be used to recover any session information that would assist the network element to gain visibility to the media plane data exchanged during the session.

Figure 2B:
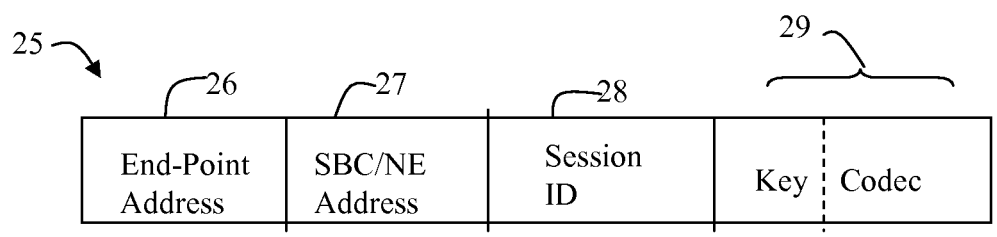

FIG. 2B illustrates exemplary fields that may be provided in an end-point response 25 to the request 20. The response includes a source address 26, a destination address 27, a session identifier 28, and one or more session information response fields 29, shown in the example of FIG. 2B to include a codec and a key.

Figure 3:
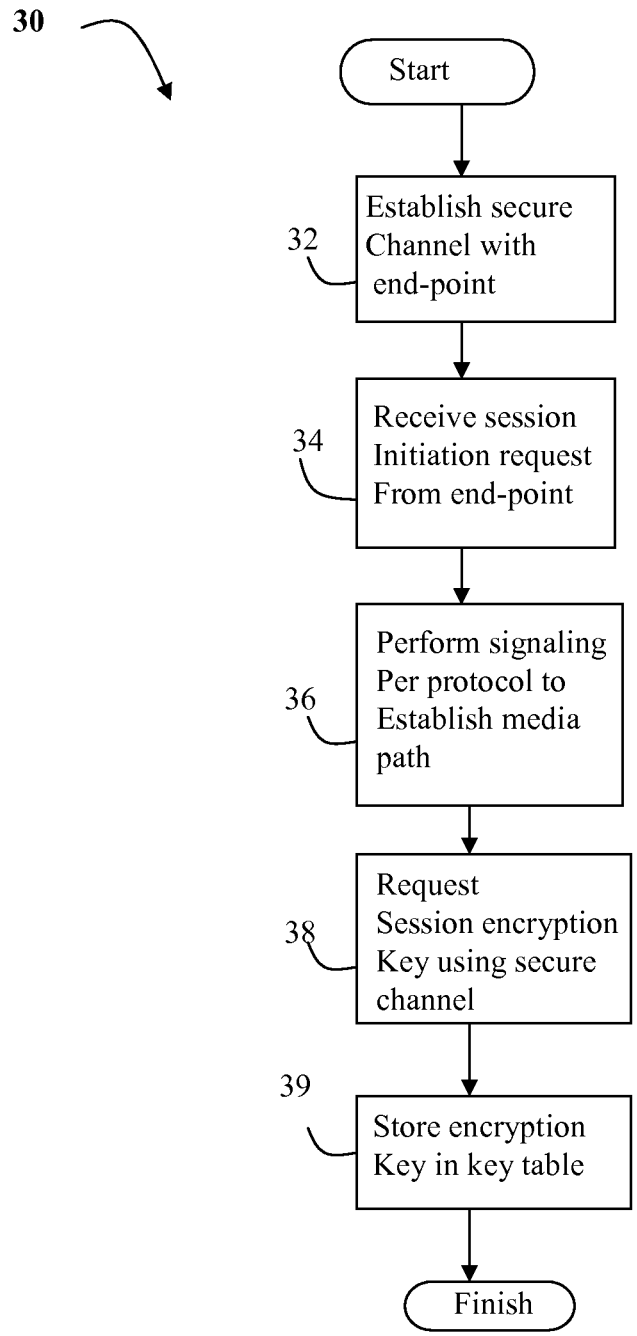
FIG. 3 is a flow diagram illustrating several exemplary steps that may be performed by a network element of the present invention during a key identification process wherein encryption keys are retrieved from end-points using a secure channel.

FIG. 3 illustrates several exemplary steps that may be performed by a process of the present invention to retrieve session information including an encryption key from an end-point. At step 32, the network element establishes a secure signaling channel with the end-point, using IPSec or TLS security protocols. Subsequently the network element receives a session initiation request from the end-point, and, co-operating with other network elements and a destination end-point, establishes a media path at step 26. During the establishment of the media path, the end-points exchange certain information, for example in Session Descriptor Protocol (SDP) packets for SIP VoIP protocol devices, which describe the codec and any encryption key or third party encryption service that is to be used to obtain keys for secure transmission of the media plane. For example, the end-points may each retrieve a key from a 3-rd party Central Authority (CA) application, exchange or derive a key between end-points on a peer to peer basis using protocols such as MiKey or other protocol, or generate a key through other services Once the characteristics of the call session and the media path have been defined, at step 28 the network element forwards a request to the end-point to retrieve any desired session information. At step 29, the network element stores the information in a table in the network element, for later access.

In the flow diagram of FIG. 3, the session information request is issued prior to the exchange of media by the end-points. By querying the end-point prior to allowing them to utilize the media plane, the network element can quickly identify uncooperative end-points, and may selectively disallow transmission over the media plane. It should be noted, however, that it is not a requirement that the request for session information occur at any particular time, or that the lack of adequate response cause the media plane communications to be terminated. For example in an alternate embodiment the network element may periodically retrieve session information from each end-point on a rotating basis. In such situations, media exchange between end-points may be started before the network element requests session information. Uncooperative end-points that do not respond to the session information requests may still be allowed to continue transmission, but may be identified as security risks. In a system where it is desirable to discreetly obtain key information without the knowledge of an end-point, it may be preferable to handle the lack of response to requests in such a manner.

FIGS. 2 and 3 illustrate methods by which the network element obtains session information such as key information using a request and response mechanism. In an alternate embodiment, the network element may affirmatively engage in the key exchange for each session, along with the end-points. For example, the network element may instigate a 3-way Diffie Hellman key exchange with the end-points, or may register with a 3-rd party key provider for the session, along with the end-points. In still another embodiment, the network element may be allowed through protocol design to stage a man-in-the-middle attack, acting as a proxy device for both end-points during a key exchange.

Figure 4:
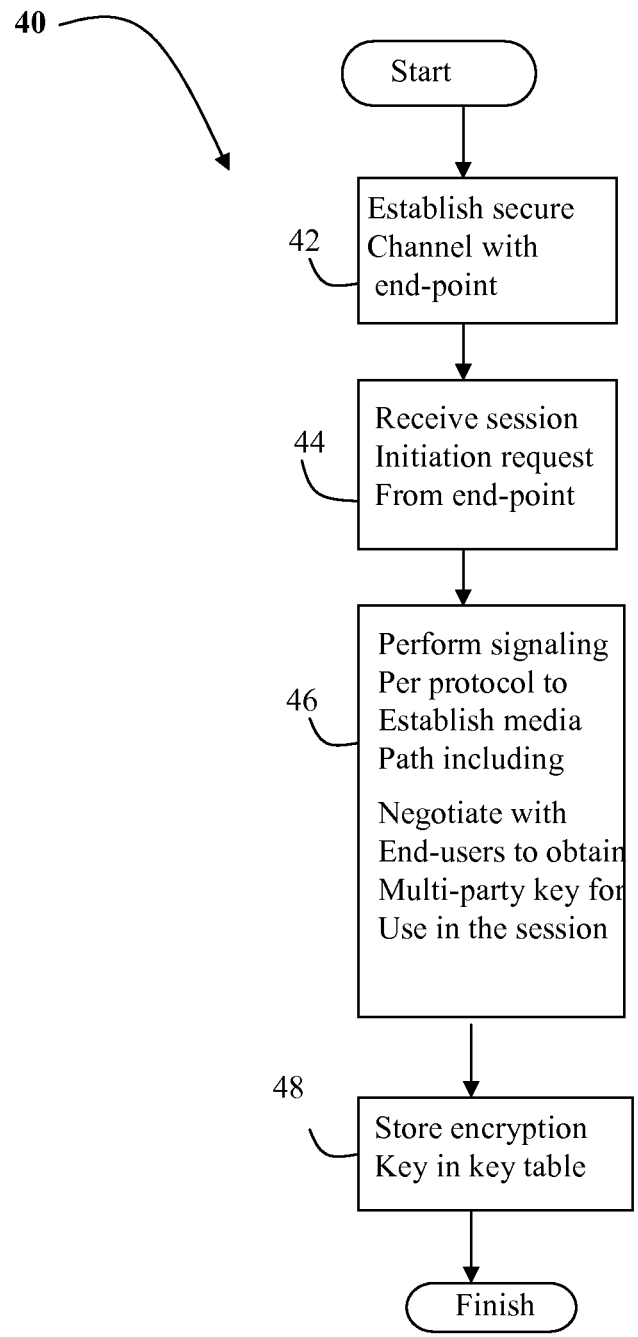
FIG. 4 is a flow diagram illustrating several exemplary steps that may be performed by a network element of the present invention during a key identification process wherein the network element participates in a key exchange negotiation with end-points in the network.

FIG. 4 is a flow diagram that illustrates exemplary steps that may be performed by a network element to obtain key data in an affirmative manner. At step 42, the network element establishes a secure channel connection with the end-point. At step 44, it receives a session initiation request and at step 46 engages in signaling to establish a media plane, including negotiation with the end-points for the encryption key to be used for the session. At step 48, the network element stores the negotiated key in a table for later use.

Media Stream Monitoring Component

Figure 5:
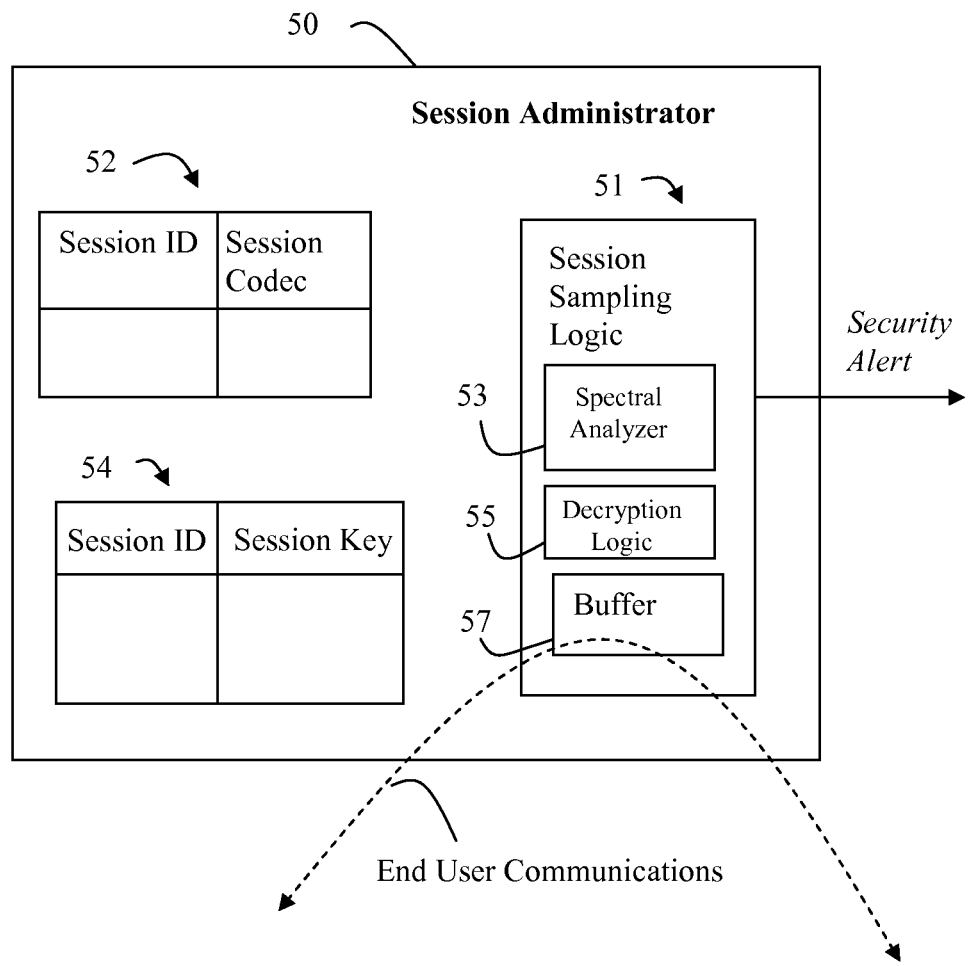
FIG. 5 is a block diagram provided to illustrate several components that may be included in a session administrator that may be included in a network element that implements the media plane encryption key identification and monitoring process of the present invention.

FIG. 5 illustrates several functional components that may be included in a session administrator 50 of network element of the present invention. The functional components may be implemented in hardware, software or a combination thereof. The tables may be stored as data structures, accessed by the hardware and software of the present invention. Although the session administrator functionality will be described with reference to the functional blocks and data structures illustrated in FIG. 5, it should be understood that these blocks are merely representative of one or more functions provided by the present invention; alternate embodiments which delineate the functionality in different manners to achieve the similar results are equivalents hereto, and the present invention is not to be limited to the illustrated embodiment.

As described above, the network element includes tables that are used to store retrieved session information. FIG. 5 illustrates a session codec table 52 and a session key table 54.

According to one aspect of the invention, the network element also includes functionality for monitoring a media stream to ensure that the end-points have provided, and continued to provide, valid key information. If the key information provided by the end-point is not valid, the service provider will not be able to decrypt the media plane, and therefore will not be able to comply with legal interception requirements. Session sampling logic 51 includes functionality for periodically sampling the media stream of each session. The size of the sampled block is a matter of design choice, but should be sufficient to determine whether randomness can be found in the sample. An exemplary sample size that is generally used to identify randomness is 20,000 bits, although the present invention is not limited to any particular size. Sampled media blocks may be stored in a buffer 57. Decryption logic 55 uses information from the codec table 52 and key table 54 to first decode and subsequently decrypt the sampled media blocks.

The present invention recognizes that the frequency spectrums of encrypted transmissions vary significantly from those of voice and facsimile transmissions. Encrypted data, by definition, is random, and thus the frequency spectrum of encrypted data is similar to that of white noise. In contrast, voice and fax data is relatively normalized, with signals in fairly specific frequency ranges with a high degree of redundancy which results in a non-random spectrum. A spectral analyzer 53 is provided in the present invention to determine whether the sampled data is encrypted. The spectral analyzer basically performs a randomness test on the signal frequencies in the sample. For example in one embodiment, a Chi Square analysis may be used to compare the sampled spectrum against an expected diffused spectrum associated with encrypted data. Alternatively, existing statistical random number generating tests can be used to test the randomness of the sampled bearer channel information. Exemplary random number generator (RNG) tests include, but are not limited to a Monobit Test, a Poker Test, a Runs Test and a Long Runs Test.

The monobit test operates by counting the number of ones in the sampled bits stream, and determining the sample to be random if there is approximately the same number of ones as zero's in the stream. For example, where the bitstream is comprised of N bits, and the number of ones is denoted by the number X. For a bit stream of N=20,000 bits, a randomness test may be passed if $9,725 < X < 10,275$.

The poker test operates by dividing the bit stream into N/4 consecutive 4-bit segments. Then the number of occurrences of the 16 possible 4 bit values are counted and stored. Denote f(i) as the number of each 4 bit value i, where $0 \leq i \leq 15$. For N=20,000, determine the results of equation I below:

$$X = (16/5000) * \left( \sum_{i=0}^{15} [f(i)^2] \right) - 5000 \quad \text{Equation I}$$

The test may be passed if $2.16 < X < 46.17$.

To perform the run test, a run is defined as a maximal sequence of consecutive bits of either all ones or all zeros that is part of the sample stream. The incidences of runs (for both consecutive zeros and consecutive ones) of all lengths ($\geq 1$) in the sample stream should be counted and stored. The test may be passed if the runs that occur (of lengths 1 through 6) are each within the corresponding interval specified in the table I below. This must hold for both the zeros and ones (i.e., all 12 counts should lie in the specified interval). For the purposes of this test, runs of greater than 6 are considered to be of length 6.

TABLE I

| Length of Run | Required Interval |
| --- | --- |
| 1 | 2,315-2,685 |
| 2 | 1,114-1,386 |
| 3 | 527-723 |
| 4 | 240-384 |
| 5 | 103-209 |
| 6+ | 103-209 |

A long run is defined to be a run of length 26 or more (of either zeros or ones). On the sample of 20,000 bits, the test is passed if there are no long runs.

The spectral analyzer 53 use any of the above described techniques to analyze raw sampled data in either the analog or digital domain, to identify whether the data is encrypted, or also to analyze decrypted sampled data, to determine whether the key that was used to decrypt the sample was a valid key. In either case, if the result of the spectral analysis indicates that the session administrator does not have a valid key for the session, the end-point of the session can be readily identified, and appropriate action can be taken.

Figure 6:
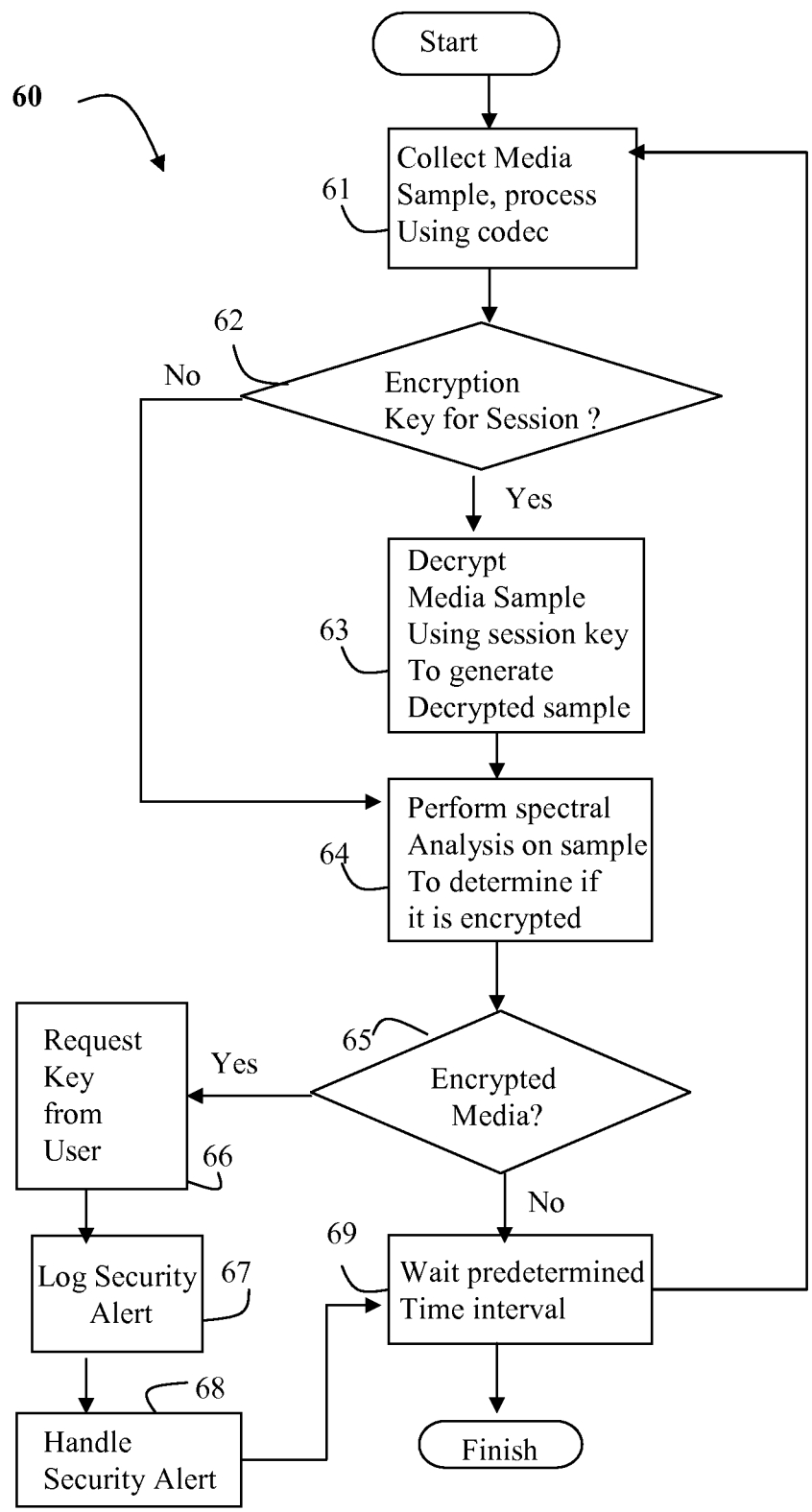
FIG. 6 is a flow diagram provided to illustrate several exemplary steps that may be performed by a network element during the monitoring process of the present invention.

Referring now to FIG. 6, a flow diagram of an exemplary process 60 that uses the components of the session administrator will now be described. At step 51, a media sample is collected, and processed using the codec for the session.

At step 62 it is determined whether there is an encryption key in the table associated with the session. If so, the process proceeds to step 63 where the media sample is decrypted using the associated key from the key table. Following decryption (or if there was no key for the session in the key table) the process proceeds to step 64 where a spectral analysis of the sample is performed to determine if the distribution of signal frequencies in the sample is random in nature, thereby suggesting encryption. If it is determined at step 65 that the sample is encrypted, then the process proceeds to step 65, where in one embodiment a request for the key for the session is forwarded to one or more end-points associated with the session. At step 67 a security alert may be logged for the session, and at step 68 the security alert is handled in a pre-defined manner.

If it was determined that the media was not encrypted at step 65, or after the security alert is logged, the process proceeds to step 69, where the administrator waits a predetermined (or random) time interval before returning to step 61 to sample more media data.

The process illustrated in FIG. 6 refers to monitoring of one session, but it can be appreciated that the network element would monitor each ongoing session to ensure that any key data that it has remains accurate.

Security Alert Component

According to one aspect of the invention, a security alert component may advantageously be included with the above described component to control further session operation for those sessions identified as potential security risks. In one embodiment, the network element may be programmed by the LEMA to react to detection of encrypted media in a predefined manner. For example, the LEMA may provide an escalation schedule to the network element which indicates when the failure to obtain a key should result in a security alert, and how the security alert should be handled (i.e., by logging session information and/or forwarding the session information to the LEMA). The escalation schedule may vary depending upon the location of the end-points, the frequency of the invalid key detections or other criteria as determined by the LEMA.

The security alert component takes advantage of the ability of the service provider to pro-actively identify security risks based on end-point behavior. For example, as opposed to the prior art where potential security risks are identified by the LEMA, the present invention allows the SP to flag the potential security risks to the LEMA. As a result the LEMA may direct their resources and observation scope in a more controlled manner.

Figure 7:
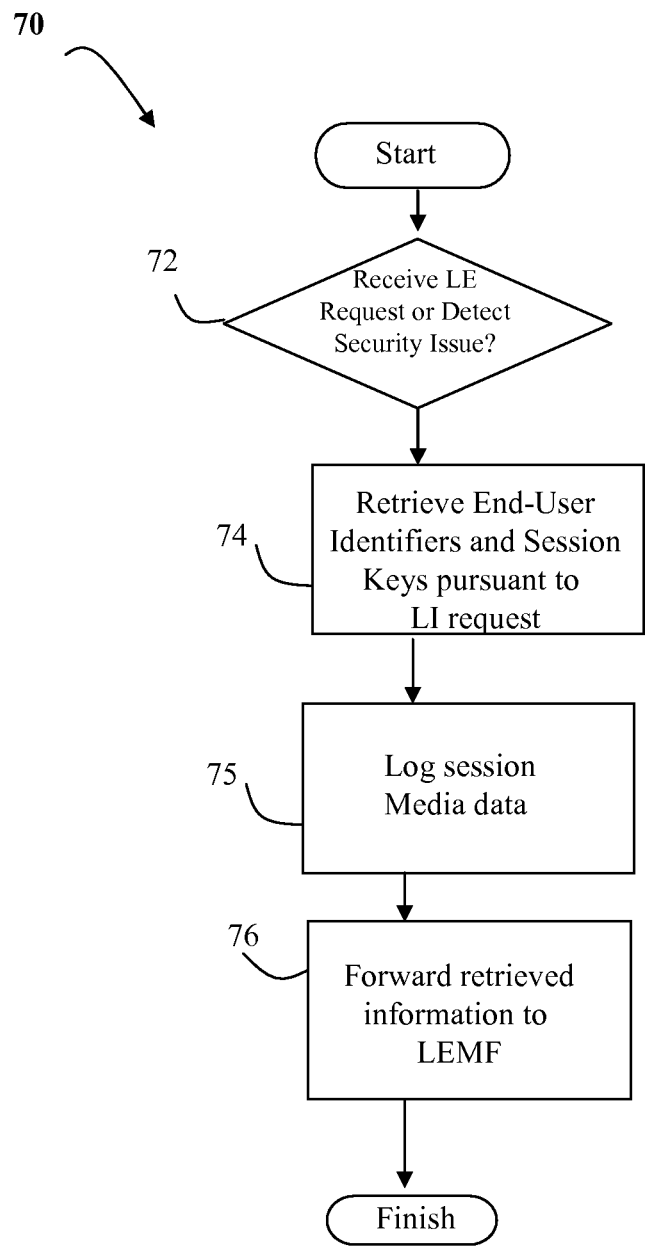
FIG. 7 is a flow diagram provided to illustrate several exemplary steps that may be performed by a network element of the present invention to report key and session information to a legal interceptor.

FIG. 7 is a flow diagram illustrating several exemplary steps that may be performed by a network element to provide the intercepted data to the LEMA. At step 72 the network element receives a request from the LEMA for key data or determines that an end-point is a potential security risk that needs to be escalated to the LE. At step 74, the network element gathers session information for delivery to the LEMA. In one embodiment, the network element stores the media data in a log to be later streamed over to the LEMA. At step 76, the requested information is forwarded over to the LEMA, consistent with any previous instructions. In this manner the network element can provide advance notice to law enforcement agencies of potential security risks.

Accordingly methods and apparatus have been described that enable encrypted end-point communications in a VoIP network to be accessed by a service provider. The mechanism includes a session information retrieval component which gathers session information such as encryption keys for each session that traverses a network element. The encryption keys may be used to decrypt data to make it available for lawful interception. A media stream monitoring component monitors media streams and verifies that the identified keys for each session are valid, to ensure continuity in compliance with LI regulations. Advantageously a security alert component may be used to controls further session operation for those sessions identified as potential security risks. With such an arrangement, the service provider can satisfy the legal requirement to provide interception, verify that the accuracy of the legal interception support and take appropriate steps to handle security risks.

Having described various embodiments of the invention, it will be appreciated that many of the above figures are flowchart illustrations of methods, apparatus (systems) and computer program products according to an embodiment of the invention. It will be understood that each block of the flowchart illustrations, and combinations of blocks in the flowchart illustrations, can be implemented by computer program instructions. These computer program instructions may be loaded onto a computer or other programmable data processing apparatus to produce a machine, such that the instructions which execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using baseband signaling or broadband signaling techniques, including carrier wave signaling techniques, such as over computer or telephone networks via a modem The above description and figures have included various process steps and components that are illustrative of operations that are performed by the present invention. However, although certain components and steps have been described, it is understood that the descriptions are representative only, other functional delineations or additional steps and components can be added by one of skill in the art, and thus the present invention should not be limited to the specific embodiments disclosed. In addition it is understood that the various representational elements may be implemented in hardware, software running on a computer, or a combination thereof.

While the invention is described through the above exemplary embodiments, it will be understood by those of ordinary skill in the art that modification to and variation of the illustrated embodiments may be made without departing from the inventive concepts herein disclosed. Accordingly, the invention should not be viewed as limited except by the scope and spirit of the appended claims.

The invention claimed is:

1. A method of obtaining session information in a network comprising a plurality of end-points coupled by at least one network element, the method comprising:
    establishing a secure communication channel with a first end-point by the at least one network element;
    forwarding session initiation requests and responses between the first end-point and the second end-point to establish a session for an exchange of media between the first end-point and the second end-point, the session having a characteristic;
    retrieving the characteristic of the session from the first end-point using the secure channel;
    storing the characteristic of the session, wherein the characteristic of the session is a key that is used to encrypt media of the session;
    periodically capturing blocks of media exchanged between the first end-point and the second end-point;
    attempting to decrypt the blocks of media using the key;
    analyzing the blocks of media for which decryption was attempted to determine whether the key provided by the first end-point is valid, wherein analyzing the blocks of media for which decryption was attempted to determine whether the key provided by the first end-point is valid includes analyzing the blocks of media for which decryption was attempted to determine whether the blocks of media for which decryption was attempted remain encrypted by employing a spectral analyzer separate from the first and second end-points to perform a randomness test on signal frequencies within the blocks of media to determine whether the blocks of media include random data; and logging information associated with the session if it is determined that the media remains encrypted after performing spectral analysis for use by legal interceptors.

2. The method of claim 1, wherein the characteristic of the session is associated with a manipulation of media data that is exchanged between the first end-point and the second end-point.

3. The method of claim 2, wherein the manipulation of media data includes encryption of the media data, and wherein the characteristic is a key that is used to encrypt the media data.

4. The method of claim 2, wherein the manipulation of media data includes translation of audio signals to digital signals, and wherein the characteristic is a codec associated with the media data.

5. The method of claim 2, wherein the manipulation of media data includes compression of the media data, and wherein the characteristic identifies a type and degree of compression applied to the media data.

6. The method of claim 1, wherein the step of forwarding requests and responses uses the Session Initiation Protocol.

7. The method of claim 1, wherein the step of forwarding requests and responses uses the H.323 protocol.

8. The method of claim 1, wherein the first end-point and second end-point communicate using a Voice over Internet Protocol network.

9. The method according to claim 3, wherein the key is obtained via a negotiation between the first end-point, the second end-point and the network element.

10. The method according to claim 3 wherein the key is obtained via a secure negotiation between the first end-point and the second end-point.

11. The method of claim 1, wherein the step of analyzing includes performing at least one of a Chi Square spectral analysis, a Monobit analysis, a Poker analysis, a Runs analysis and a Long Runs analysis of the decrypted blocks of media.

12. The method of claim 1, further including the steps of:
receiving a request from a legal interceptor for access to the session;
forwarding characteristic information associated with the session to the legal interceptor.

13. The method of claim 1, wherein the characteristic of the session includes codec information associated with the media, and wherein the method further includes the step of:
periodically capturing blocks of media exchanged between the first end-point and the second end-point; and
processing the blocks of media using the codec and spectral analysis to determine whether the blocks of media are encrypted.

14. A network element comprising:
at least one computer for:
establishing a secure communication channel with a first end-point by the at least one network element;
forwarding session initiation requests and responses between the first end-point and the second end-point to establish a session for an exchange of media between the first end-point and the second end-point, the session having a characteristic;
retrieving the characteristic of the session from the first end-point using the secure channel;
storing the characteristic of the session, wherein the characteristic of the session is a key that is used to encrypt media of the session;
session sampling logic implemented by the at least one computer for periodically sampling media exchanged in the session between the first and second end-points; and
analysis logic, coupled to the session sampling logic, for:
monitoring media exchanged between the first and second end-points;
determining whether the encryption methods used on the media are known, wherein determining whether encryption methods used on the media are known includes attempting to decrypt the media using the key and analyzing the media for which decryption was attempted to determine whether the media for which decryption was attempted remains encrypted by employing a spectral analyzer separate from the first and second end-points to perform a randomness test on signal frequencies within the media to determine whether the media includes random data; and
marking sessions having unknown encryption methods as potential security risks,
wherein the analysis logic further includes logging logic for logging session information of sessions determined to be at risk for use by legal interceptors.

15. The network element of claim 14 further including notification logic for notifying legal interceptors of sessions identified to be potential security risks.

16. The network element of claim 14, further comprising a key table for storing, for each session between each one of a plurality of end-points coupled to the network element, a value of a key used to encrypt media of the associated session, and wherein the analysis logic includes decryption logic for decrypting the periodically sampled media using the associated key and spectral analysis logic for determining whether the decrypted periodically sampled media remains encrypted.

* * * * *